United States Patent
Ohba et al.

(10) Patent No.: US 10,501,117 B2
(45) Date of Patent: Dec. 10, 2019

(54) VEHICLE

(71) Applicant: NTN CORPORATION, Osaka (JP)

(72) Inventors: Hirokazu Ohba, Shizuoka (JP); Taisuke Igi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 105 days.

(21) Appl. No.: 15/320,856

(22) PCT Filed: Jun. 19, 2015

(86) PCT No.: PCT/JP2015/067695
§ 371 (c)(1),
(2) Date: Dec. 21, 2016

(87) PCT Pub. No.: WO2015/198979
PCT Pub. Date: Dec. 30, 2015

(65) Prior Publication Data
US 2017/0137059 A1 May 18, 2017

(30) Foreign Application Priority Data

Jun. 27, 2014 (JP) .................................. 2014-132429

(51) Int. Cl.
*B62D 7/15* (2006.01)
*B60K 7/00* (2006.01)
(Continued)

(52) U.S. Cl.
CPC ............. *B62D 7/1527* (2013.01); *B60G 3/20* (2013.01); *B60G 3/26* (2013.01); *B60K 7/00* (2013.01);
(Continued)

(58) Field of Classification Search
CPC ........ B62D 7/1527; B62D 7/18; B62D 3/126; B60K 7/0007; B60K 2007/0092;
(Continued)

(56) References Cited

U.S. PATENT DOCUMENTS

| 6,913,102 B2* | 7/2005 | Sugata | B60K 7/0007 |
| | | | 180/236 |
| 2010/0051377 A1* | 3/2010 | Sugitani | B62D 6/008 |
| | | | 180/443 |

(Continued)

FOREIGN PATENT DOCUMENTS

| JP | 7-257412 | 10/1995 |
| JP | 3076541 | 8/2000 |

(Continued)

OTHER PUBLICATIONS

Extended European Search Report dated Jul. 3, 2017 in corresponding European Application No. 15811327.4.
International Preliminary Report on Patentability and Written Opinion of the International Searching Authority dated Dec. 27, 2016 in corresponding International (PCT) Application No. PCT/JP2015/067695.

*Primary Examiner* — Jacob D Knutson
*Assistant Examiner* — Felicia L. Brittman
(74) *Attorney, Agent, or Firm* — Wenderoth, Lind & Ponack, L.L.P.

(57) ABSTRACT

The present invention provides a vehicle including wheels, and a steering module configured to steer the wheels in one of two mutually opposite right and left directions, or in one and the other of the two mutually opposite right and left directions, respectively. In the vehicle, a caster angle is set within the range of ±3 degrees relative to a kingpin angle. Though each wheel usually forms a camber angle when steered, by setting in the wheel the caster angle beforehand within the above range, the wheel does not or is less likely to form the camber angle because the camber angle and the caster angle cancel each other. Therefore, it is possible to prevent the steering angles of the wheels from being restricted, and to prevent the deterioration of steering operability.

4 Claims, 12 Drawing Sheets

(51) Int. Cl.
*B60G 3/20* (2006.01)
*B62D 3/12* (2006.01)
*B60G 3/26* (2006.01)
*B62D 7/18* (2006.01)
*B62D 7/09* (2006.01)

(52) U.S. Cl.
CPC .............. *B60K 7/0007* (2013.01); *B62D 3/12* (2013.01); *B62D 3/126* (2013.01); *B62D 7/09* (2013.01); *B62D 7/1509* (2013.01); *B62D 7/18* (2013.01); *B60G 2200/144* (2013.01); *B60G 2200/156* (2013.01); *B60G 2200/18* (2013.01); *B60G 2200/44* (2013.01); *B60G 2300/50* (2013.01); *B60K 2007/0038* (2013.01); *B60K 2007/0092* (2013.01)

(58) Field of Classification Search
CPC ........ B60G 3/20; B60G 3/26; B60G 2200/18; B60G 2200/156
USPC ........................................................ 180/253
See application file for complete search history.

(56) References Cited

U.S. PATENT DOCUMENTS

| | | |
|---|---|---|
| 2013/0056288 A1 | 3/2013 | Gano et al. |
| 2015/0014952 A1 | 1/2015 | Morikawa |
| 2015/0151778 A1* | 6/2015 | Kageyama ............... B60G 3/20 701/41 |
| 2016/0052356 A1* | 2/2016 | Tamura ................ B60K 7/0007 180/65.51 |
| 2016/0280259 A1* | 9/2016 | Ishikawa .................. B62D 7/09 |

FOREIGN PATENT DOCUMENTS

| | | |
|---|---|---|
| JP | 2005-297782 | 10/2005 |
| JP | 2011-173563 | 9/2011 |
| JP | 2013-184577 | 9/2013 |
| WO | 2008/128379 | 10/2008 |

* cited by examiner

VEHICLE

TECHNICAL FIELD

The present invention relates to a vehicle provided with a driving and steering module configured to drive and steer wheels of the vehicle, particularly to the structure of the vehicle in which camber angles are not formed as the wheels are steered.

BACKGROUND ART

In normal vehicles, a kingpin axis defines or sets a kingpin angle (inclination of the kingpin axis relative to the vertical direction when the kingpin axis is seen from the front side of the vehicle) and a caster angle (inclination of the kingpin axis relative to the vertical direction when the kingpin axis is seen from the lateral side of the vehicle), and a camber angle which is formed when the wheel is steered (angle defined by the longitudinal center line of the wheel and the vertical line when the wheel is seen from the front side of the vehicle) increases the stability of the vehicle traveling in a straight line. However, as illustrated in FIGS. 13(*a*) and 13(*b*), a camber angle δ resulting from setting a kingpin angle keeps a wheel w of a vehicle inclined toward one side of the wheel in its width direction (i.e., keeps the wheel w in the "negative camber" state illustrated in FIG. 13(*a*) or in the "positive camber" state illustrated in FIG. 13(*b*)), so that the wheel is likely to interfere with the body of the vehicle or a component of the vehicle such as a stabilizer.

The larger the steering angle of the wheel w is, the larger the camber angle δ tends to be. Therefore, in order to prevent the interference between the wheel w and the body of the vehicle, etc., it is necessary to limit this steering angle within a predetermined range or to enlarge a tire house. As a result thereof, the turning radius is made large, and thus the vehicle is unable to turn with a small turning circle. Moreover, it is difficult to make the vehicle small-sized.

Moreover, uneven wear is likely to arise in the wheel w due to the inclination of the wheel w toward one side of the wheel in its width direction, and a large steering force is necessary to steer the wheel w due to the upward and downward motions of the vehicle, which result from the variation of the surface area of the vehicle w coming into contact with the ground, thus deteriorating steering operability.

In order to overcome such problems, in the below-identified Patent document 1, at least one of a kingpin angle (see "θ" in FIG. 1 of the present application) and a caster trail (the distance between the point of a kingpin axis coming into contact with the ground and the point of the center axis of a tire coming into contact with the ground when seen from the lateral side of a vehicle (see "c" in FIG. 3 of the present application)) is set at substantially 0 (zero) degree (in case of the kingpin angle) or 0 (zero) mm (in case of the caster trail), thereby preventing a camber angle δ from being formed when a wheel is steered. Moreover, a vehicle behavior detecting means, and an electric steering device are provided, and the motion and steering performance of the vehicle are increased by applying steering torque.

PRIOR ART DOCUMENTS

Patent Documents

Patent document 1: Japanese Patent No. 3076541

SUMMARY OF THE INVENTION

Problems to be Solved by the Invention

In the structure disclosed in Patent document 1, though it is possible to prevent the occurrence of the camber angle, by setting the kingpin angle at 0 (zero) degree, etc., the vehicle may not be able to travel in a stable state. Also, a delay tends to arise when steering torque is applied, and thus it is not suitable for such a travel situation in which high responsiveness is required as when the vehicle is traveling at a high speed.

It is an object of the present invention to prevent a steering angle from being restricted by a camber angle, resulting from steering each wheel of a vehicle, and to prevent the deterioration of steering operability.

Means for Solving the Problems

In order to achieve the above object, the present invention provides a vehicle comprising: wheels; and a steering module configured to steer the wheels in one of two mutually opposite right and left directions, or in one and another of the two mutually opposite right and left directions, respectively, characterized in that a caster angle is set within a range of ±3 degrees relative to a kingpin angle.

For example, if the kingpin angle is set at 5 degrees, when the wheel is steered around the kingpin axis by 90 degrees relative to the direction in which the vehicle travels in a straight line, the wheel forms a camber angle having the same angle (5 degrees) as this kingpin angle. Though each wheel usually forms a camber angle when steered, by setting in the wheel the caster angle beforehand, the wheel does not or is less likely to form the camber angle because the camber angle and the caster angle cancel each other. It is ideal and preferable that the camber angle, resulting from steering the wheel, is set at substantially 0 (zero) degree by setting the kingpin angle and the caster angle to be equal to each other. However, by setting the caster angles within the range of ±3 degrees relative to the kingpin angles, it is possible to prevent or reduce the occurrence of the camber angles to such an extent that the upward and downward motions of the vehicle, resulting from steering the wheels, can be prevented, while preventing the contact between the wheels and the body of the vehicle, etc. Therefore, even when the wheels are steered to a large degree, it is possible to ensure excellent steering operability.

If the caster angle is not within the above range, the caster angle is unable to offset the camber angle. Therefore, it is impossible to set the camber angle within a permissible range.

When the right and left wheels of the front wheels or the rear wheels are steered by the steering module in one and another of the two mutually opposite right and left directions, the wheels form a shape like the Japanese character "ハ" so as to widen toward the center of the vehicle. However, when both the right and left front wheels and the right and left rear wheels are steered in the same manner, the front and rear suspension structures of the vehicle (upper arms, lower arms, kingpin angles, kingpin offset amount, caster angles, etc.) are arranged so as to form mirror images of each other relative to the vertical plane bisecting the vehicle into front and rear portions, and the right and left suspension structures of the vehicle are also arranged so as to form mirror images of each other relative to the vertical plane bisecting the vehicle into right and left portions. Such a symmetrical arrangement can make the positions and inclinations of the respective wheels equal to each other when the travel mode is switched to a special travel mode, so that the vehicle does not incline, and thus can travel in a stable state. Moreover, it is possible to design the arms used in the front and rear portions of the vehicle such that all of the arms have the same shape, and thus to simplify the structure of the vehicle.

Moreover, since it is possible to steer the wheels with a small steering force while ensuring excellent steering operability, a large driving force is not required in a motor for steering the wheels, and in gears, etc. through which motive power is transmitted. Therefore, it is possible to make this steering module small-sized.

It is preferable that the wheels comprise at least a pair of right and left wheels which are either a pair of front wheels of the vehicle, or a pair of rear wheels of the vehicle, and the vehicle further comprises in-wheel motors provided, respectively, in the pair of right and left wheels so as to drive the pair of right and left wheels.

By using in-wheel motors as driving modules of the wheels, the vehicle can dispense with an engine which is to be mounted to normal vehicles. Since the vehicle can dispense with an engine, it is possible to expand tire houses to the space in which an engine is usually to be received, and thus to enlarge the maximum steering angles of the wheels.

It is preferable that the kingpin angle is set within a range of 4 to 10 degrees in the vehicle.

If the kingpin angles are set within the range of 4 to 10 degrees, it is possible to prevent or reduce the upward and downward motions of the vehicle when the wheels are steered, while ensuring the travel stability of the vehicle in the normal travel mode. The kingpin angles set at less than 4 degrees reduce the travel performance of the vehicle when traveling in a straight line in the normal travel mode. Also, even if the caster angles are set, the kingpin angles set at more than 10 degrees increase the upward and downward motions of the vehicle when the wheels are steered, thereby deteriorating steering operability.

It is preferable that t the steering module is capable of steering the pair of right and left wheels by 90 degrees relative to a direction in which the vehicle travels in a straight line.

Since the wheels of the vehicle can be steered by 90 degrees in this way, which is larger than the steering angles of the wheels of normal vehicles, the travel mode of the vehicle can be switched not only to "normal travel mode" but also to a special travel mode such as "pivot turn mode" in which the steering angles of the wheels are larger than those of the wheels steered in the normal travel mode or "lateral movement mode" in which the wheels are turned by 90 degrees.

Preferably, the vehicle is configured such that the steering module comprises: a pair of first and second rack bars configured to steer the pair of right and left wheels; and a rack bar moving means for moving the first and second rack bars in one of two opposite directions along which rack teeth of the first and second rack bars are arranged, or in one and another of the two opposite directions, respectively, by a same distance, and the rack bar moving means comprises: a synchronizing gear assembly meshing with the first and second rack bars such that a movement of the first rack bar in one of the two opposite directions is converted to a movement of the second rack bar in another of the two opposite directions; a first pinion gear meshing with the first rack bar; a second pinion gear meshing with the second rack bar; and a coupling mechanism configured such that the first pinion gear and the second pinion gear can be coupled together or uncoupled from each other by the coupling mechanism.

In the normal travel mode of the vehicle, the first and second pinion gears are coupled together by the coupling mechanism such that the first and second rack bars are integrally fixed, so that the right and left wheels can be steered in the same direction as in when a steering wheel is operated in a conventional manner. On the other hand, in a special travel mode such as "lateral movement mode" or "pivot turn mode", the first and second pinion bars are uncoupled from each other by the coupling mechanism such that the first and second rack bars are moved in the opposite directions to each other, so that the right and left wheels can be steered in the opposite directions to each other.

Effects of the Invention

In the vehicle of the present invention comprising wheels and a steering module configured to steer the wheels in one of two mutually opposite right and left directions, or in one and another of the two mutually opposite right and left directions, respectively, a caster angle is set within a range of ±3 degrees relative to a kingpin angle. By setting the caster angle beforehand within this range, a camber angle and the caster angle cancel each other. Therefore, it is possible to prevent the steering angles of the wheels from being restricted due to the camber angles, which result from steering the wheels, and to prevent the deterioration of steering operability.

BRIEF DESCRIPTION OF THE DRAWINGS

FIG. 8(*b*) is a front view of the coupling mechanism in an uncoupled state.

BEST MODE FOR CARRYING OUT THE INVENTION

Figure 1:
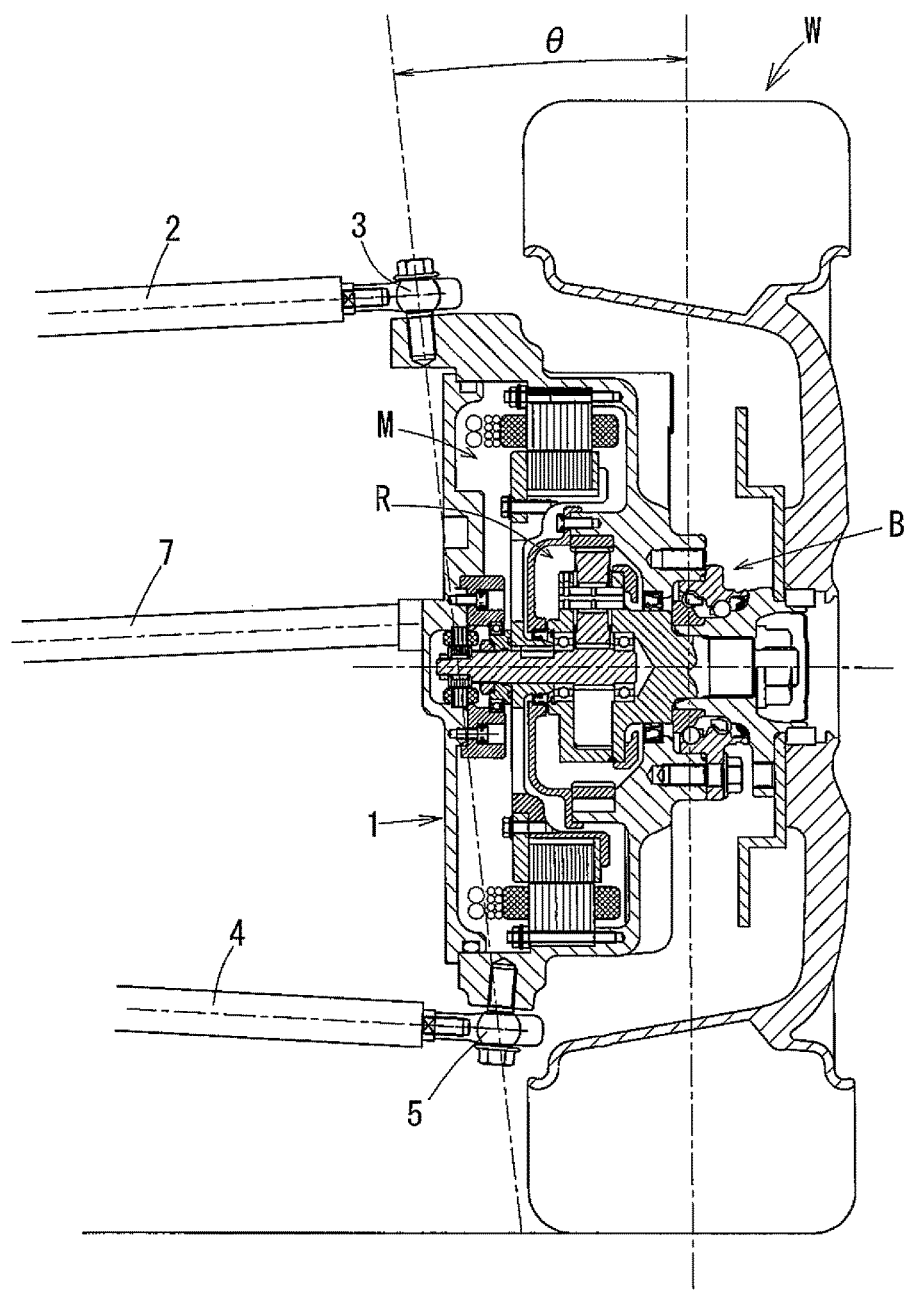
FIG. 1 is a vertical sectional view of a suspension structure of each wheel of a vehicle according to the present invention.

The vehicles embodying the present invention are now described with reference to the drawings. FIG. 1 is a vertical sectional view of the suspension structure of each wheel w of a vehicle according to one embodiment of the present invention, when seen from the front side of the vehicle. A driving module 1 (in-wheel motor assembly) is mounted in the wheel body of the wheel w. The suspension structure is of a double wishbone structure, and thus includes an upper arm 2 coupled to the wheel w through an upper arm ball joint 3, and a lower arm 4 coupled to the wheel w through a lower arm ball joint 5. The suspension structure has a kingpin angle ("θ" in the drawings), which is the angle between the straight line extending through the upper arm ball joint 3 and the lower arm ball joint 5, and a vertical line, namely, a line extending in the vertical direction. A tie rod 7 attached to the below-described steering module 6 is connected to the wheel w so as to steer the wheel w in the right and left directions.

The driving module 1 (in-wheel motor assembly) is constituted by a driving motor M configured to generate a driving force, a speed reducer R configured to reduce the rotation of the driving motor M, and a wheel bearing B through which the rotation reduced by the speed reducer R is transmitted to the wheel w. The driving motor M comprises a radial gap type, synchronous or induction AC motor, and is controlled by an inverter (not shown) on the basis of the command of a main electronic control unit (ECU) provided in the vehicle so as to control the entire vehicle. The speed reducer R is a planetary gear reduction mechanism. The wheel bearing B is a double-row angular ball bearing. While the in-wheel motor assembly 1 shown includes a speed reducer R in the form of a planetary gear reduction mechanism, an in-wheel motor assembly including a different speed reducer, or a direct-drive in-wheel motor may be used instead.

Figure 2:
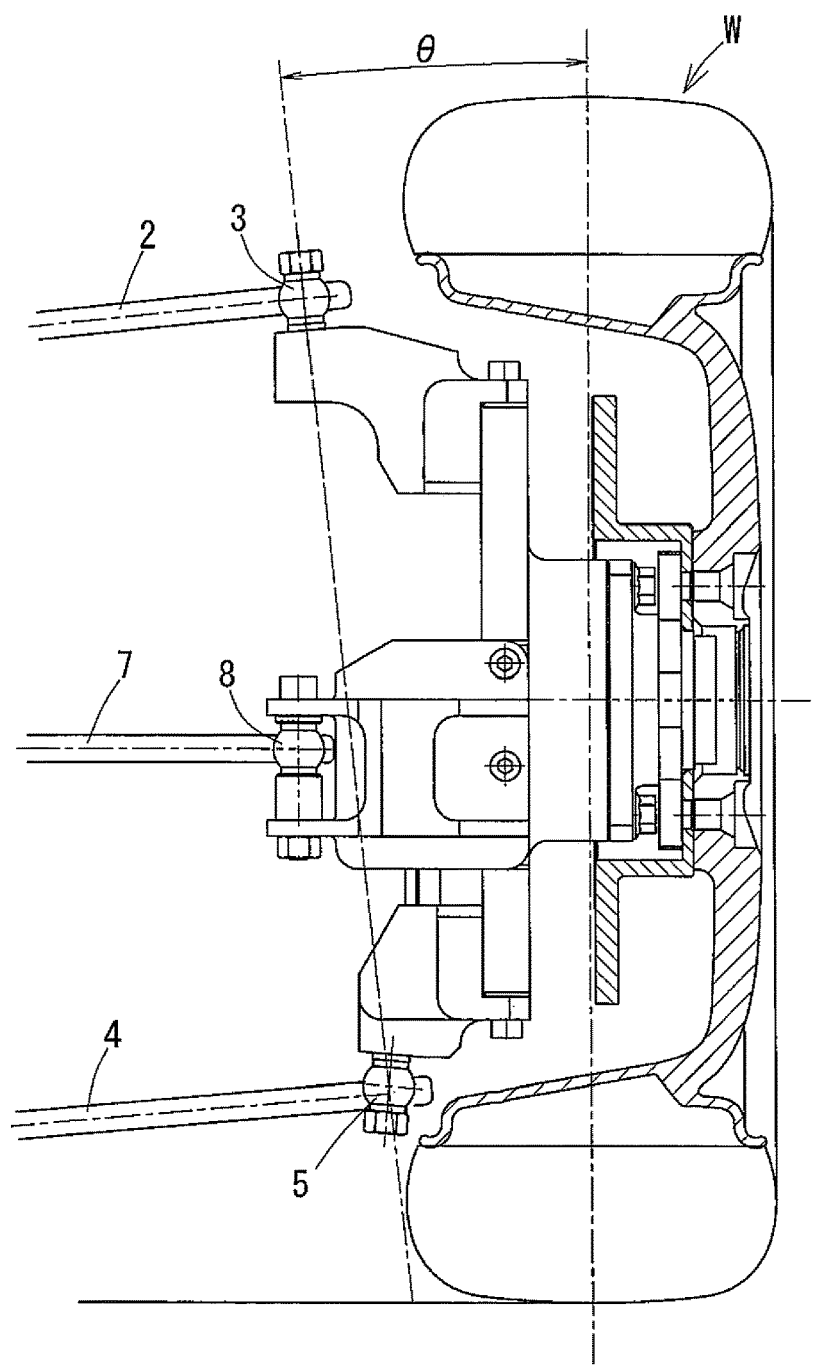
FIG. 2 is a vertical sectional view of another suspension structure of each wheel of the vehicle according to the present invention.

FIG. 2 is a vertical sectional view of the suspension structure of each wheel w of a vehicle according to another embodiment of the present invention, when seen from the front side of the vehicle. In this embodiment, no driving module 1 is mounted in the wheel w, and a normal knuckle is used instead. The suspension structure of this embodiment is also of a double wishbone structure, as in the embodiment of FIG. 1. If the suspension structure of FIG. 2 is identical in geometry to the suspension structure of FIG. 1, which means that the former includes the same upper arm 2 and the lower arm 4, and has the same kingpin angle, as the latter, the suspension structures of FIG. 1 may be used only for the front wheels while using the suspension structures of FIG. 2 for the wheels, or vice versa.

Figure 3:
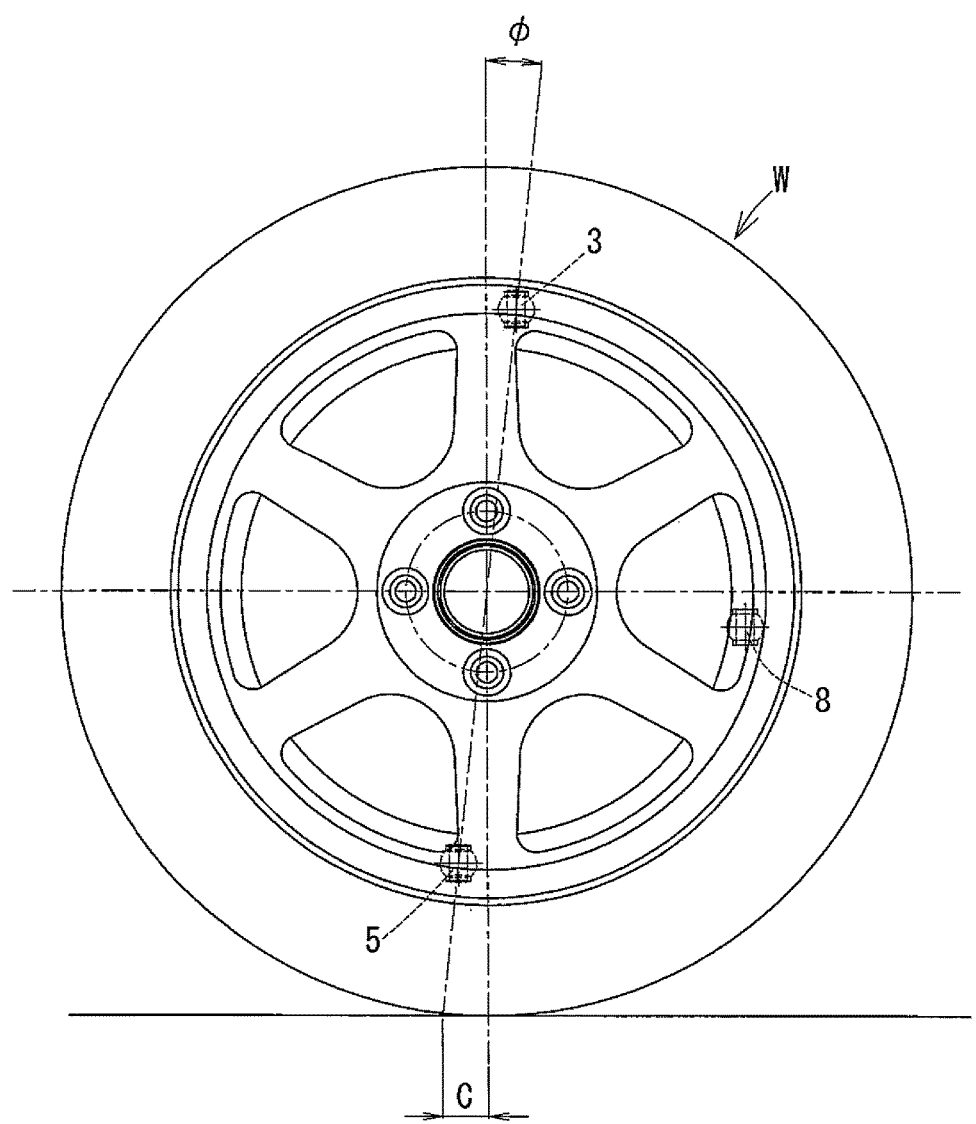
FIG. 3 is a side view of the left front wheel of the vehicle.

As can be seen from FIG. 3, illustrating the left front wheel seen from the lateral side of the vehicle, each suspension structure of the vehicle according to either of the above embodiments has a caster angle (Φ in FIG. 3). The caster angle Φ is the inclination angle of the kingpin axis relative to the vertical direction when the kingpin axis is seen from the lateral side of the vehicle. Hereinafter, and in the drawings, the caster angle Φ inclined clockwise in FIG. 3 relative to the vertical direction is indicated by a positive value. While, in FIG. 3, the suspension structure is designed such that the caster angle Φ is formed at the center of the wheel body of the wheel w, but may be designed such that the caster angle Φ is formed at a position displaced from the center of the wheel body of the wheel w.

Figure 4:
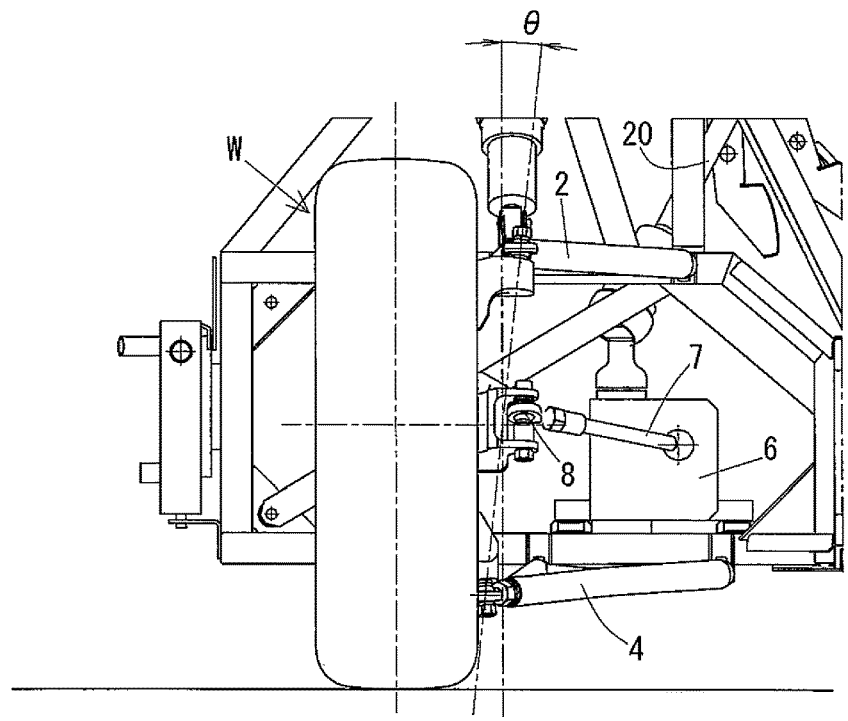
FIG. 4 is a side view illustrating one of the wheels steered by 90 degrees (example).

In FIG. 4, which is a side view of one of the wheels w seen from the lateral side of the vehicle, the kingpin angle θ and the caster angle Φ are each set at 6 degrees, and the wheel w has been steered by 90 degrees (such that the travel mode of the vehicle is switched from "normal travel mode" to "lateral movement mode"). By steering the wheel w by 90 degrees as shown, the wheel w usually forms a camber angle δ due to the kingpin angle θ. However, in FIG. 4, the wheel w does not form a camber angle δ because the king pin angle θ and the caster angle Φ are equal to each other, and thus cancel each other. Therefore, the wheels w can come into contact with the ground in a substantially straight state so as to hardly generate upward and downward motions of the vehicle, which result from steering the wheels. As a result thereof, it is possible to smoothly steer the wheels.

Figure 5:
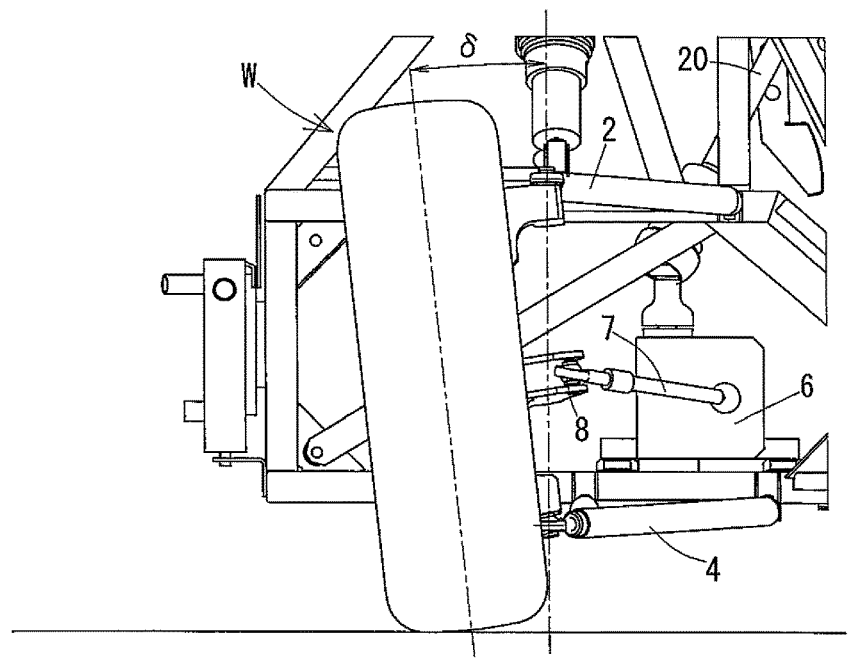
FIG. 5 is a side view illustrating one of the wheels steered by 90 degrees (comparative example).

In FIG. 5, which is a side view of one of the wheels w, the kingpin angle θ is set at 6 degrees with the caster angle Φ set at 0 (zero) degree, and the wheel w has been steered by 90 degrees. In this state, unlike the case illustrated in FIG. 4, the wheel w forms a camber angle δ (positive camber) due to the kingpin angle θ by steering the wheel w by 90 degrees. Though in FIG. 5, the wheel w is shown to become wedged into the ground, in an actual situation, the wheel w will never become wedged into the ground, and instead, the vehicle body will be lifted by the amount by which the wheel would have become wedged into the ground as the wheels w pivot around the respective kingpin axes. If the kingpin angles θ are set at 6 degrees with the caster angles Φ set at 0 (zero) degree for all of the four wheels of the vehicle, all the four wheels will form camber angles δ (positive cambers), such camber angles δ are different from the camber angles δ when the vehicle is traveling in the normal travel mode, so that the vehicle tends to be unstable during a special travel mode such as the lateral movement mode.

Figure 6:
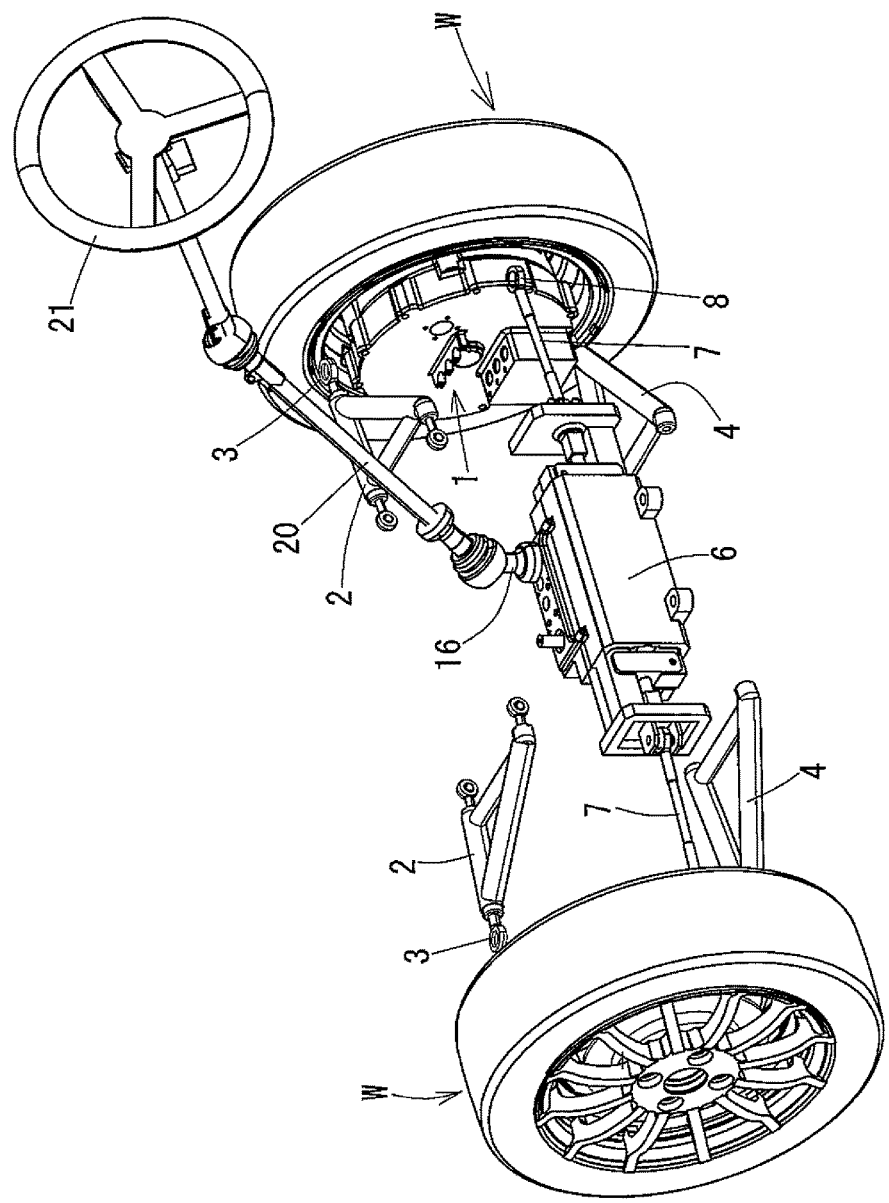
FIG. 6 is a perspective view illustrating a steering module mounted to the front wheels of the vehicle.

FIG. 6 shows an embodiment in which a steering module 6 is attached to the vehicle between the right and left front wheels, specifically at the central space between the front wheels w so as to steer the front wheels w. The right and left tie rods 7 are connected to the steering module 6 and respective tie rod ball joints 8. By activating the steering module 6, as described later, the steering module 6 can steer the right and left wheels w either in the same direction, i.e., one of the two mutually opposite right and left directions, or in one and the other of the opposite right and left directions, respectively. Driving modules 1 (in-wheel motor assemblies) may be provided in the wheel bodies of the front and rear wheels, or may be provided in the wheel bodies of only the rear wheels.

Figure 7:
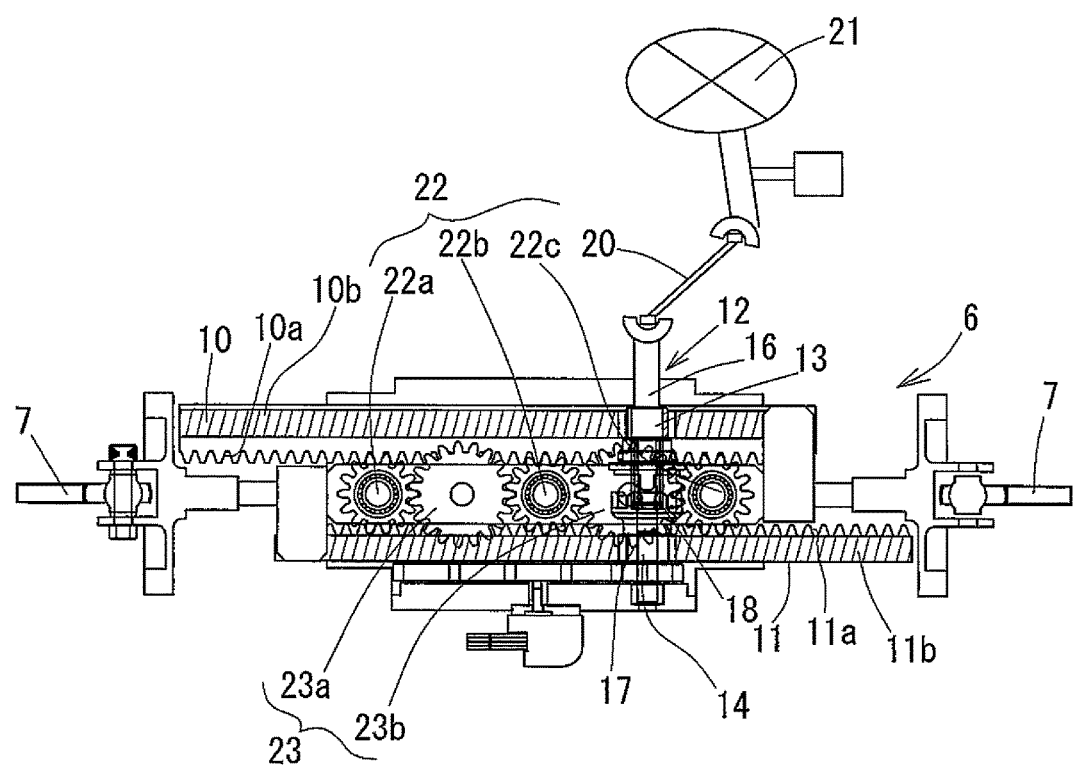
FIG. 7 is a vertical sectional view of the steering module illustrated in FIG. 6.

FIG. 7 is a vertical sectional view of the steering module 6 illustrated in FIG. 6. The steering module 6 includes a pair of first and second rack bars 10 and 11 configured to steer the right and left wheels w in one, or one and the other, of the right and left directions, and a rack bar moving means 12 for moving the rack bars 10 and 11 by the same distance in one of the opposite right and left directions, or in one and the other of the opposite right and left directions, respectively. The rack bar moving means 12 includes a synchronizing gear assembly meshing with the rack bars 10 and 11 such that the movement of the rack bar 10 in one of the right and left directions, along which the rack teeth of the rack bar 10 are arranged, is converted to the movement of the rack bar 11 in the other of the right and left directions. The rack bar moving means 12 further includes a first pinion gear 13 meshing with a steering rack gear 10b formed on the rack bar 10; a second pinion gear 14 meshing with a steering rack gear 11b formed on the rack bar 11; and a coupling mechanism 18 by which the first and second pinion gears 13 and 14 are coupled together or uncoupled from each other. The first pinion gear 13 rotates about the axis of a first rotary shaft 16 together with the first rotary shaft 16. The second pinion gear 14 rotates about the axis of a second rotary shaft 17 together with the second rotary shaft 17.

The tie rods 7 are coupled to the respective rack bars 10 and 11, configured to steer the right and left front wheels in one, or one and the other, of the right and left directions. The tie rods 7 are connected through the respective tie rod ball joints 8 to the in-wheel motors comprising the driving modules 1 or to the knuckles if the in-wheel motors are not provided. Therefore, the steering module 6 can steer the wheels w in the right direction and/or the left direction due to the rightward movement and/or the leftward movement of the rack bars 10 and 11.

Figure 8A:
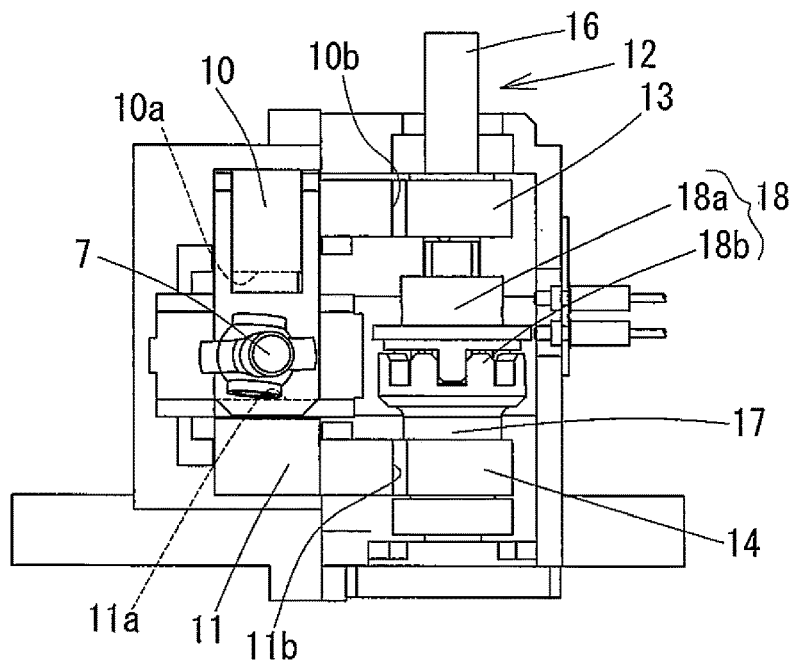
FIG. 8(*a*) is a front view of a coupling mechanism in a coupled state.
Figure 8B:
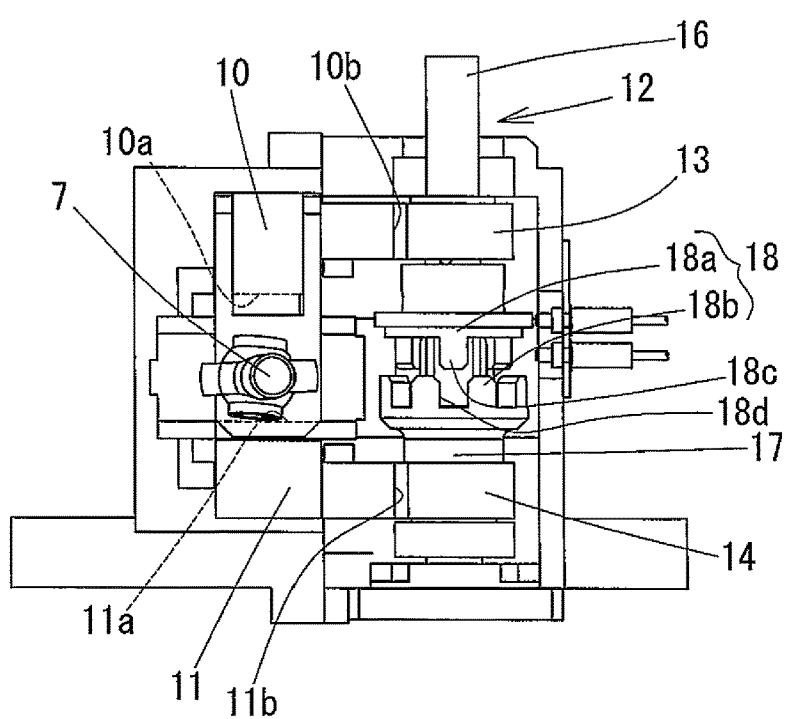

As illustrated in FIGS. 8(a) and 8(b), the coupling mechanism 18 includes a movable portion 18a formed with a protrusion 18c and mounted to the first rotary shaft 16, and a fixed portion 18b formed with a recess 18d and mounted to the second rotary shaft 17, and is configured such that when the movable portion 18a is pressed against the fixed portion 18b by an elastic member such as a spring (not shown), the protrusion 18c of the movable portion 18a is engaged in the recess 18d of the fixed portion 18b (see FIG. 8(a)), thereby enabling the first and second rotary shafts 16 and 17 to rotate together. The coupling mechanism 18 may be configured such that the protrusion 18c and the recess 18c are arranged conversely, specifically, such that the protrusion 18c is formed on the fixed portion 18b, and the recess 18d is formed in the movable portion 18a.

The coupling mechanism 18 is further configured such that when the movable portion 18a is separated from the fixed portion 18b by an actuator (not shown), the protrusion 18c of the movable portion 18a is disengaged from the recess 18d of the fixed portion 18b (see FIG. 8(b)), thereby enabling the first and second rotary shafts 16 and 17 to rotate separately from each other. As described later, this enables the second rack bar 11 to move in the direction opposite to the direction in which the first rack bar 10 moves, so that the steering module 6 can steer the right and left wheels w, coupled to the respective tie rods 7, in one and the other of the opposite right and left directions, respectively.

As illustrated in FIG. 6, the first rotary shaft 16 is connected to a steering wheel 21 through a steering shaft 20. As illustrated in FIG. 7, the synchronizing gear assembly is constituted by first synchronizing gears 22 and second synchronizing gears 23. The first synchronizing gears 22 comprise three gears 22a, 22b and 22c spaced apart from each other at regular intervals in the direction along which the rack teeth of the rack bars 10 and 11 are arranged. The second synchronizing gears 23 comprise a gear 23a arranged between the adjacent gears 22a and 22b of the first synchronizing gears 22, and a gear 23b arranged between the adjacent gears 22b and 22c of the first synchronizing gears 22.

The second synchronizing gears 23 are in mesh with neither of a synchronizing rack gear 10a of the first rack bar 10 and a synchronizing rack gear 11a of the second rack bar 11, and are in mesh with only the first synchronizing gears 22. The second synchronizing gears 23 function to rotate the three gears 22a, 22b and 22c of the first synchronizing gears 22 by the same angle in the same direction. The second synchronizing gears 23 enable the first and second rack bars 10 and 11 to smoothly move relative to each other.

When the first rotary shaft 16, which includes the first pinion gear 13, and the second rotary shaft 17, which includes the second pinion gear 14 are coupled together by the coupling mechanism 18 illustrated in FIGS. 8(a) and 8(b) (as shown in FIG. 8(a)), the first and second rotary shafts 16 and 17 rotate together in the same direction while rotating about their respective axes, so that the first rack bar 10 in mesh with the first pinion gear 13, and the second rack gear 11 in mesh with the second pinion gear 14 are moved by the same distance in the same right or left direction. Due to the movements of the rack bars 10 and 11 in the same direction, the steering module 6 can steer the right and left wheels w, coupled to the respective tie rods 7, in the same right or left direction.

When the first rotary shaft 16, which includes the first pinion gear 13, and the second rotary shaft 17, which includes the second pinion gear 14, are uncoupled from each other by the coupling mechanism 18 (see FIG. 8(b)), as the first rotary shaft 16 rotates, the first pinion gear 13 moves the first rack bar 10 in one of the right and left directions. As the first rack bar 10 is moved, due to the action of the synchronizing gear assembly (the first and second synchronizing gears 22 and 23), the second rack bar 11 is moved in the other of the right and left directions, i.e., in the direction opposite to the direction in which the first rack bar 10 is moved. Due to the movements of the rack bars 10 and 11, the steering module 6 can steer the right and left wheels w, coupled to the respective tie rods 7, in one and the other of the opposite right and left directions, respectively.

Figure 9:
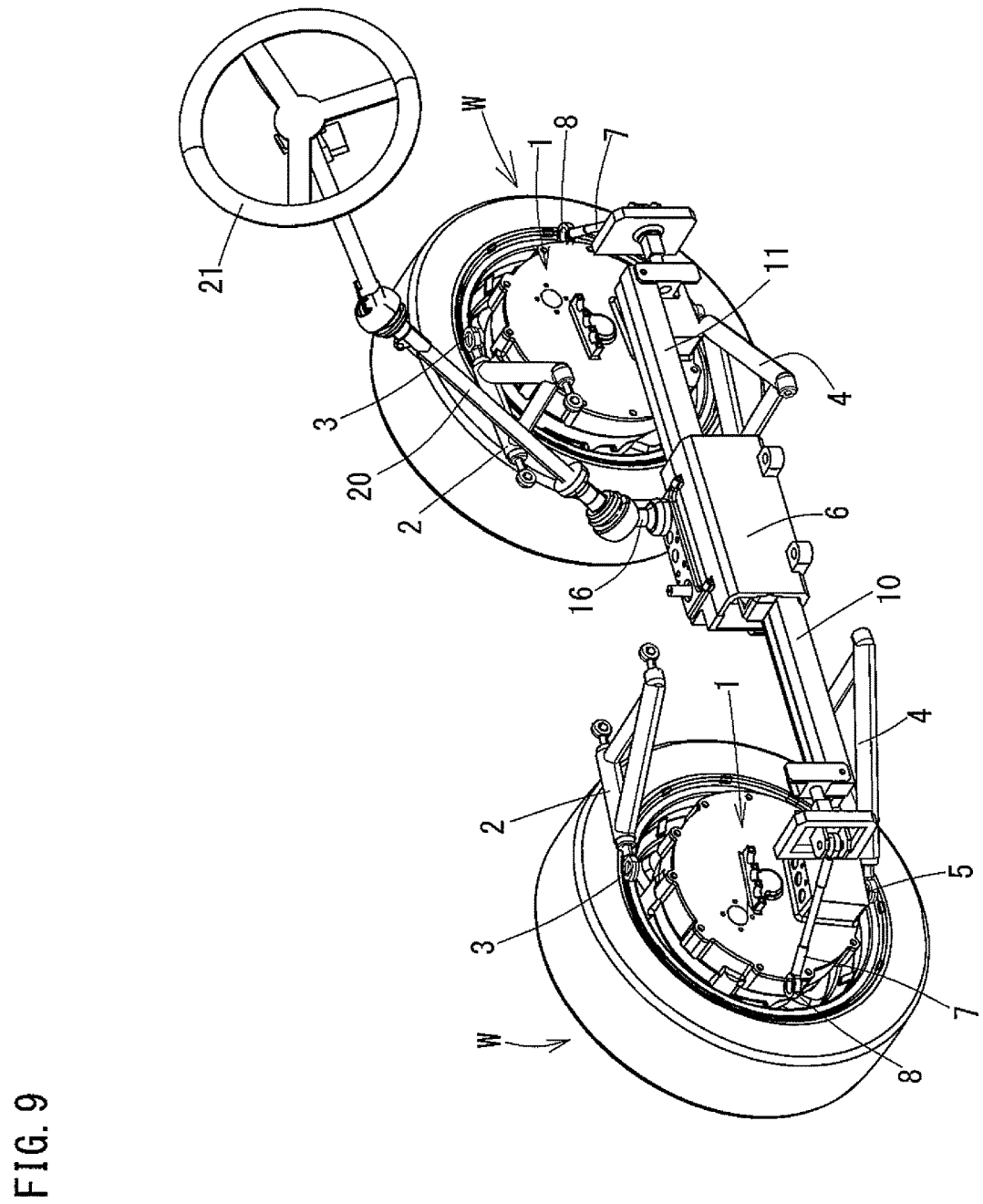
FIG. 9 is a perspective view illustrating the lateral movement mode to which the travel mode is switched in the vehicle illustrated in FIG. 6.
Figure 10:
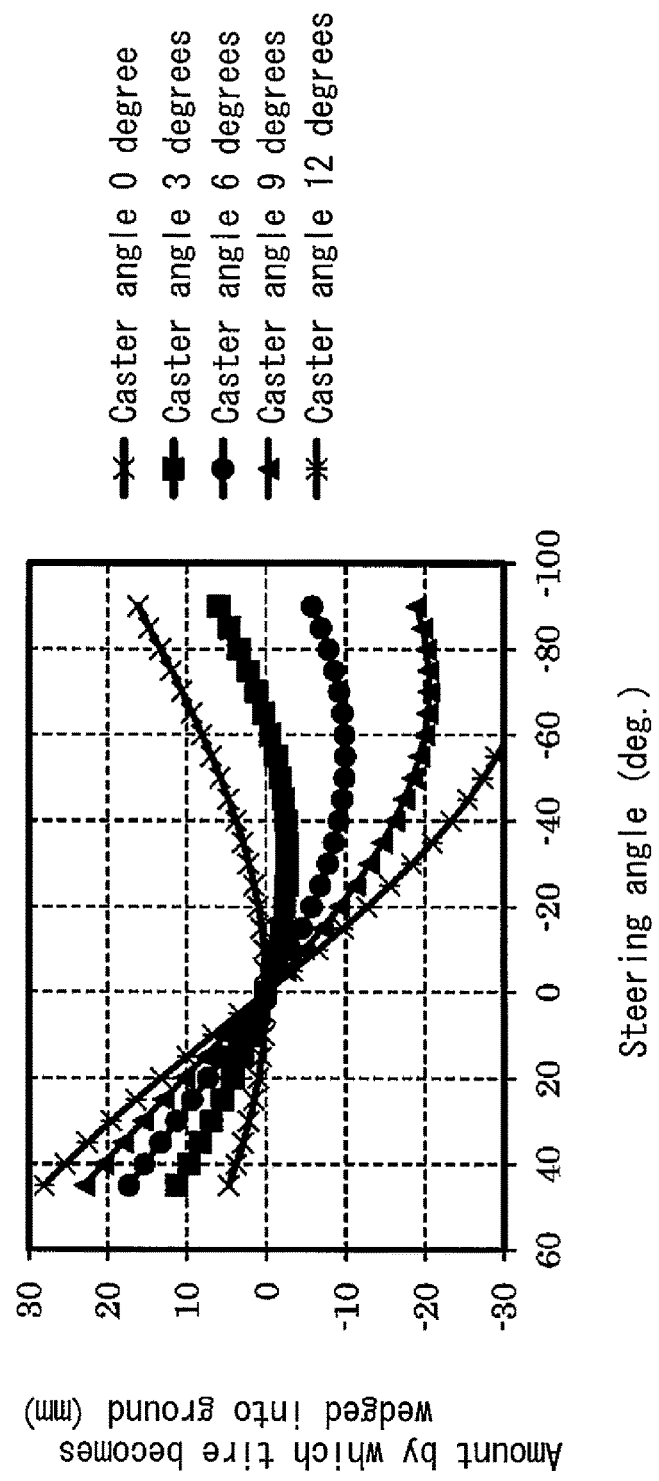
FIG. 10 is a graph illustrating the relationship between the steering angle (of the wheel) around the kingpin axis and the amount by which the tire of the wheel becomes wedged into the ground (with the kingpin angle set at 6 degrees), as calculated in a computer simulation.
Figure 11:
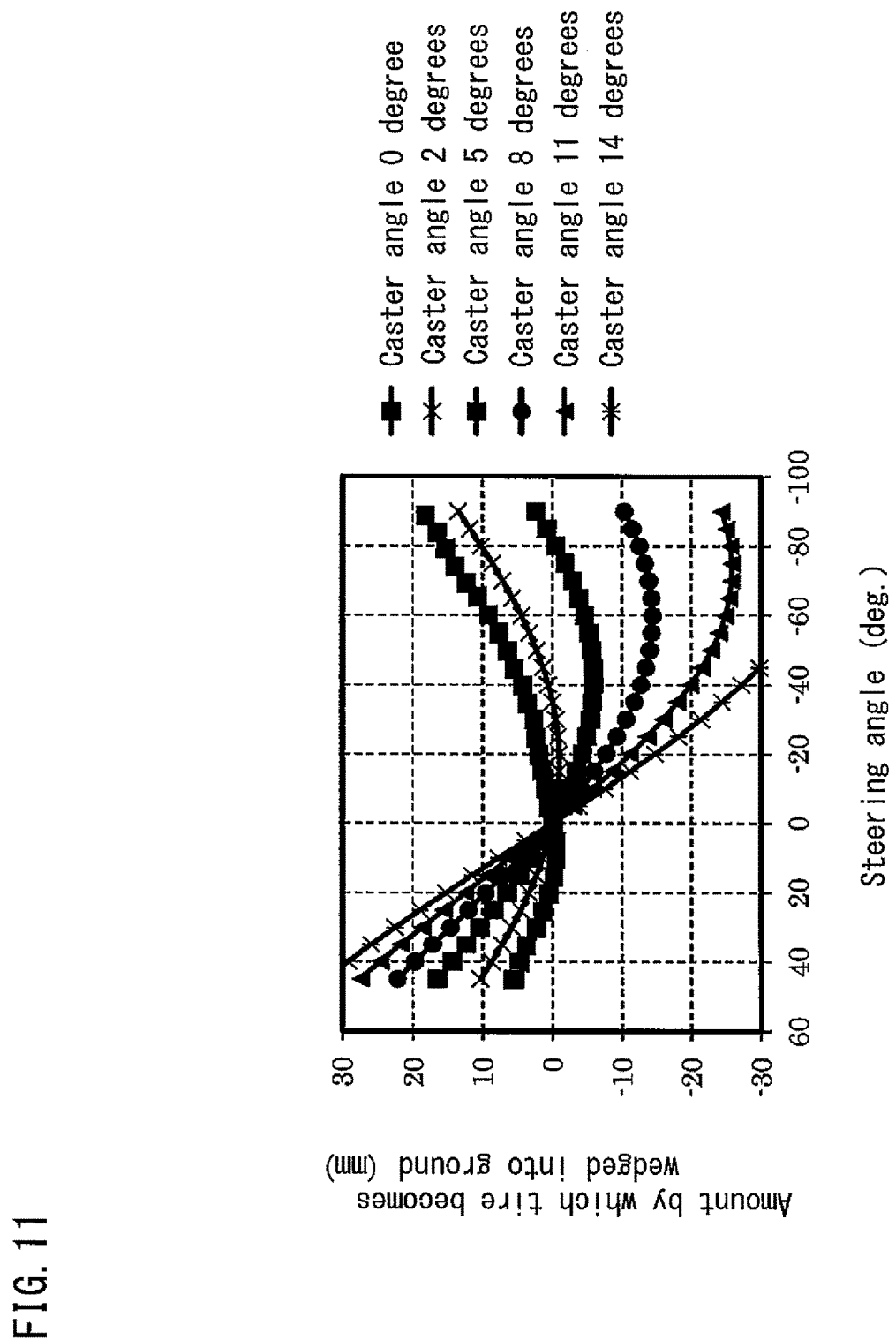
FIG. 11 is a graph illustrating the relationship between the steering angle around the kingpin axis and the amount by which the tire of the wheel becomes wedged into the ground (with the kingpin angle set at 8 degrees), as calculated in a computer simulation.

FIG. 9 illustrates the lateral movement mode of the vehicle to which the travel mode is switched from the normal travel mode illustrated in FIG. 6. Due to the action of the steering module 6 illustrated in FIG. 7, the right and left wheels w have been steered by 90 degrees in one and the other of the opposite right and left directions, respectively. FIGS. 10 and 11 illustrate the relationship, when the right and left wheels w are steered in the opposite directions to each other, between the steering angle (of the wheel w) around the kingpin axis and the amount by which the tire of the wheel becomes wedged into the ground, as calculated in a computer simulation, with the kingpin angle set at 6 degrees (FIG. 10), and at 8 degrees (FIG. 11). The lengths of the upper arm 2 and the lower arm 4, and the extent of deformation of the tire are not taken into consideration in the graphs of FIGS. 10 and 12. Therefore, the amount by which the tire becomes wedged into the ground is not exactly equal to the motion of the vehicle in the vertical direction (if the tire is not wedged into the ground), but can be considered to substantially correspond to the latter.

When, as illustrated in FIG. 10; the wheel was steered from 0 (zero) degree to 90 degrees, with the caster angle set at 0, 3, 6, 9 and 12 degrees, and the kingpin angle set at 6 degrees, the amount by which the tire became wedged into the ground changed to the largest extent when the caster angle was set at 12 degrees. In contrast thereto, the above-mentioned amount i changed to an extremely small extent when the caster angle was set at 3, 6 and 9 degrees (i.e., when the caster angle is set within the range of ±3 degrees relative to the kingpin angle). When the caster angle is set at 12 degrees, the tire did not become wedged into the ground. By decreasing the change in the amount by which the tires are wedged into the ground, it is possible to prevent the steering angles from being restricted by the camber angles, which result from steering the wheels w, and to prevent the deterioration of steering operability due to the upward and downward motions of the vehicle when the wheels are steered.

When, as illustrated in FIG. 11, the wheel was steered from 0 (zero) degree to 90 degrees, with the caster angle set at 0, 2, 5, 8, 11 and 14 degrees, and the kingpin angle set at 8 degrees, as in FIG. 10, the amount by which the tire became wedged into the ground changed to the largest extent when the caster angle was set at 14 degrees. In contrast thereto, the above-mentioned amount changed to an extremely small extent when the caster angle was set at 5, 8 and 11 degrees (i.e., when the caster angle was set within the range of ±3 degrees relative to the kingpin angle).

Figure 12:
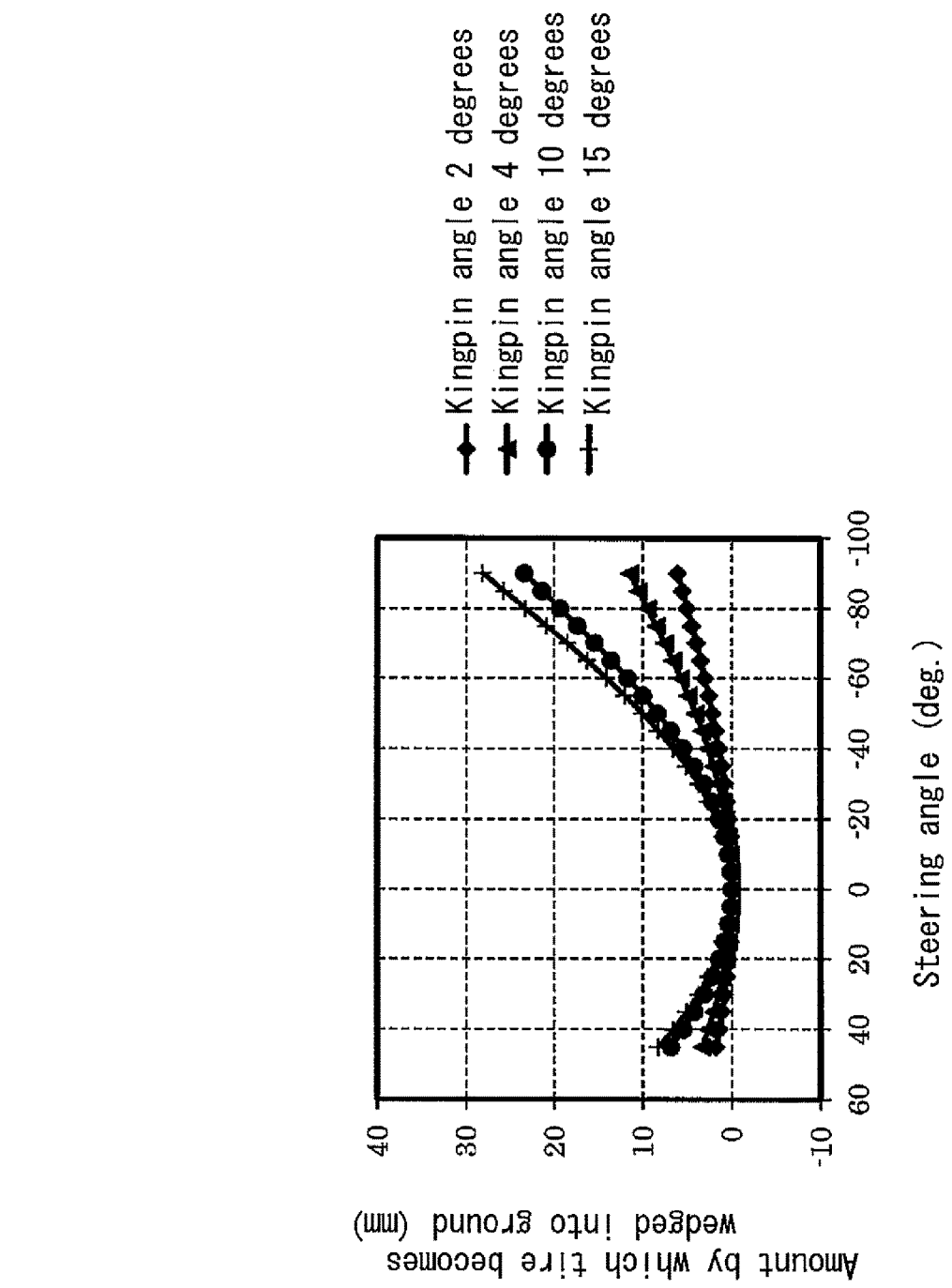
FIG. 12 is a graph illustrating the relationship between the steering angle around the kingpin axis and the amount by which the tire of the wheel becomes wedged into the ground (with the caster angle set at 0 (zero) degree), as calculated in a computer simulation.
Figure 13A:
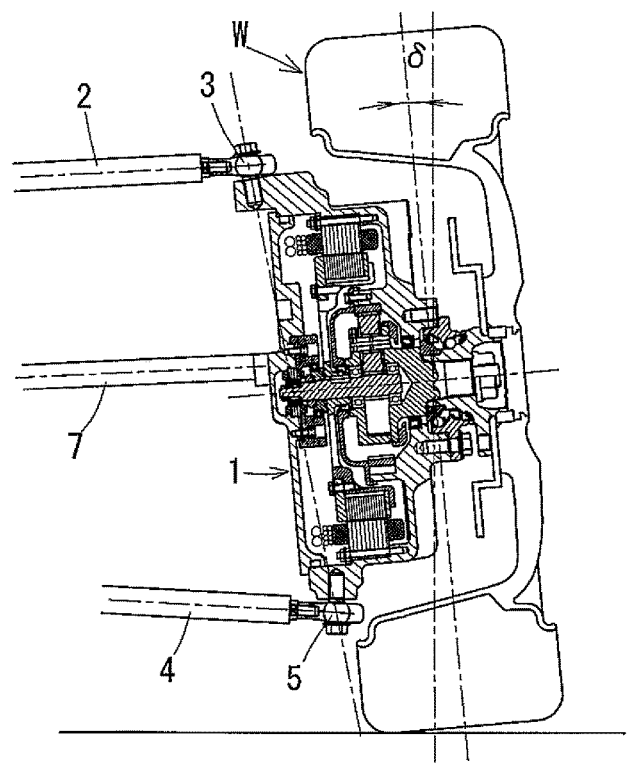
FIG. 13(a) is a side view illustrating a camber angle (negative camber) which the wheel forms.
Figure 13B:
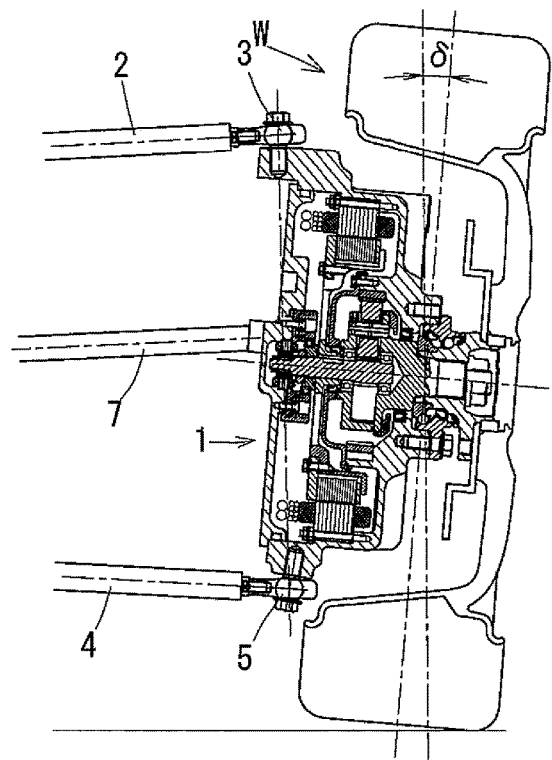
FIG. 13(b) is a side view illustrating the camber angle (positive camber) which the wheel forms.

FIG. 12 illustrates the relationship between the steering angle (of the wheel w) around the kingpin axis and the amount by which the tire (of the wheel w) becomes wedged into the ground when the kingpin angle is varied with the caster angle set at 0 (zero) degree. FIG. 12 shows that the larger the kingpin angle, the larger the change in the amount by which the tire becomes wedged into the ground when the wheel is steered, so that steering operability deteriorates. On the other hand, too small a kingpin angle would deteriorate the travel stability of the vehicle in the normal travel mode. In order to ensure both of excellent steering operability and travel stability, it is preferable that the kingpin angle is set within the range of 4 to 10 degrees.

The above embodiments are mere examples. The structure of the steering module, etc. may be modified as necessary under the condition that the object of the invention can be achieved, namely, that it is possible to prevent the steering angles from being restricted by the camber angles, resulting from steering the wheels, and to prevent the deterioration of steering operability.

DESCRIPTION OF REFERENCE NUMERALS

1: driving module (in-wheel motor assembly)
6: steering module
10, 11: rack bar
12: rack bar moving means
13: first pinion gear
14: second pinion gear
18: coupling mechanism
22: first synchronizing gear (of synchronizing gear assembly)
23: second synchronizing gear (of synchronizing gear assembly)
w: wheel
θ: kingpin angle
Φ: caster angle

The invention claimed is:
1. A vehicle comprising:
wheels; and
a steering module configured to steer the wheels in one of two mutually opposite right and left directions, or in one and another of the two mutually opposite right and left directions, respectively,
wherein a caster angle is set within a range of ±3 degrees relative to a kingpin angle, and the kingpin angle is set within a range of 4 to 10 degrees, and
wherein the steering module is capable of steering the wheels by 90 degrees relative to a direction in which the vehicle travels in a straight line.
2. The vehicle according to claim 1, wherein the wheels comprise at least a pair of right and left wheels which are either a pair of front wheels of the vehicle, or a pair of rear wheels of the vehicle, and
wherein the vehicle further comprises in-wheel motors provided, respectively, in the pair of right and left wheels so as to drive the pair of right and left wheels.
3. The vehicle according to claim 2, wherein the steering module comprises:
a pair of first and second rack bars configured to steer the pair of right and left wheels in one of the two mutually opposite right and left directions, or one and another of the two mutually opposite right and left directions, respectively; and
a rack bar moving arrangement for moving the first and second rack bars in one of two opposite directions along which rack teeth of the first and second rack bars are arranged, or in one and another of the two opposite directions, respectively, by a same distance, and
wherein the rack bar moving arrangement comprises:
a synchronizing gear assembly meshing with the first and second rack bars such that a movement of the first rack bar in one of the two opposite directions is converted to a movement of the second rack bar in another of the two opposite directions;
a first pinion gear meshing with the first rack bar;
a second pinion gear meshing with the second rack bar; and
a coupling mechanism configured such that the first pinon gear and the second pinion gear can be coupled together or uncoupled from each other by the coupling mechanism.
4. The vehicle according to claim 1, wherein the steering module comprises:
a pair of first and second rack bars configured to steer the wheels in one of the two mutually opposite right and left directions, or one and another of the two mutually opposite right and left directions, respectively; and
a rack bar moving arrangement for moving the first and second rack bars in one of two opposite directions along which rack teeth of the first and second rack bars are arranged, or in one and another of the two opposite directions, respectively, by a same distance, and
wherein the rack bar moving arrangement comprises:
a synchronizing gear assembly meshing with the first and second rack bars such that a movement of the first rack bar in one of the two opposite directions is converted to a movement of the second rack bar in another of the two opposite directions;
a first pinion gear meshing with the first rack bar;
a second pinion gear meshing with the second rack bar; and
a coupling mechanism configured such that the first pinon gear and the second pinion gear can be coupled together or uncoupled from each other by the coupling mechanism.

* * * * *